United States Patent [19]

Chang

[11] 4,345,323

[45] Aug. 17, 1982

[54] PULSE DURATION DIGITAL MULTIPLEXING SYSTEM

[75] Inventor: Paul S. Chang, Harrisburg, Pa.

[73] Assignee: AMP Incorporated, Harrisburg, Pa.

[21] Appl. No.: 110,422

[22] Filed: Jan. 7, 1980

[51] Int. Cl.³ .............................................. H04J 15/00
[52] U.S. Cl. ........................................ 370/9; 370/112
[58] Field of Search ........................... 370/9, 112, 119; 375/22

[56] References Cited

U.S. PATENT DOCUMENTS

| | | | |
|---|---|---|---|
| 3,124,750 | 3/1964 | McLean et al. | 370/9 |
| 3,281,806 | 10/1966 | Lawrance et al. | 375/22 |
| 3,337,691 | 8/1967 | Litchman | 370/112 |
| 3,623,105 | 11/1971 | Kamen | 375/22 |
| 3,808,376 | 4/1974 | Melvin | 370/112 |
| 3,825,693 | 7/1974 | Smith et al. | 179/99 |
| 3,855,419 | 12/1974 | Hurford | 370/9 |
| 4,085,287 | 4/1978 | Kullmann et al. | 375/22 |

Primary Examiner—Douglas W. Olms
Attorney, Agent, or Firm—Allan B. Osborne

[57] ABSTRACT

Method for multiplexing of digital data is disclosed, to enable simultaneous transmission/reception of a number of digital signals over a single communication channel. A plurality of inputs are clocked in and assigned respective binary coded weights. The combined binary coded decimal value of the inputs determines the time duration of a generated digital pulse. The multiplexed data is thereby represented by the length or duration of the pulse. At the receiving end, the pulse is amplified and quantized to digital level and outputs generated in correspondence to the digital transmitter inputs.

10 Claims, 14 Drawing Figures

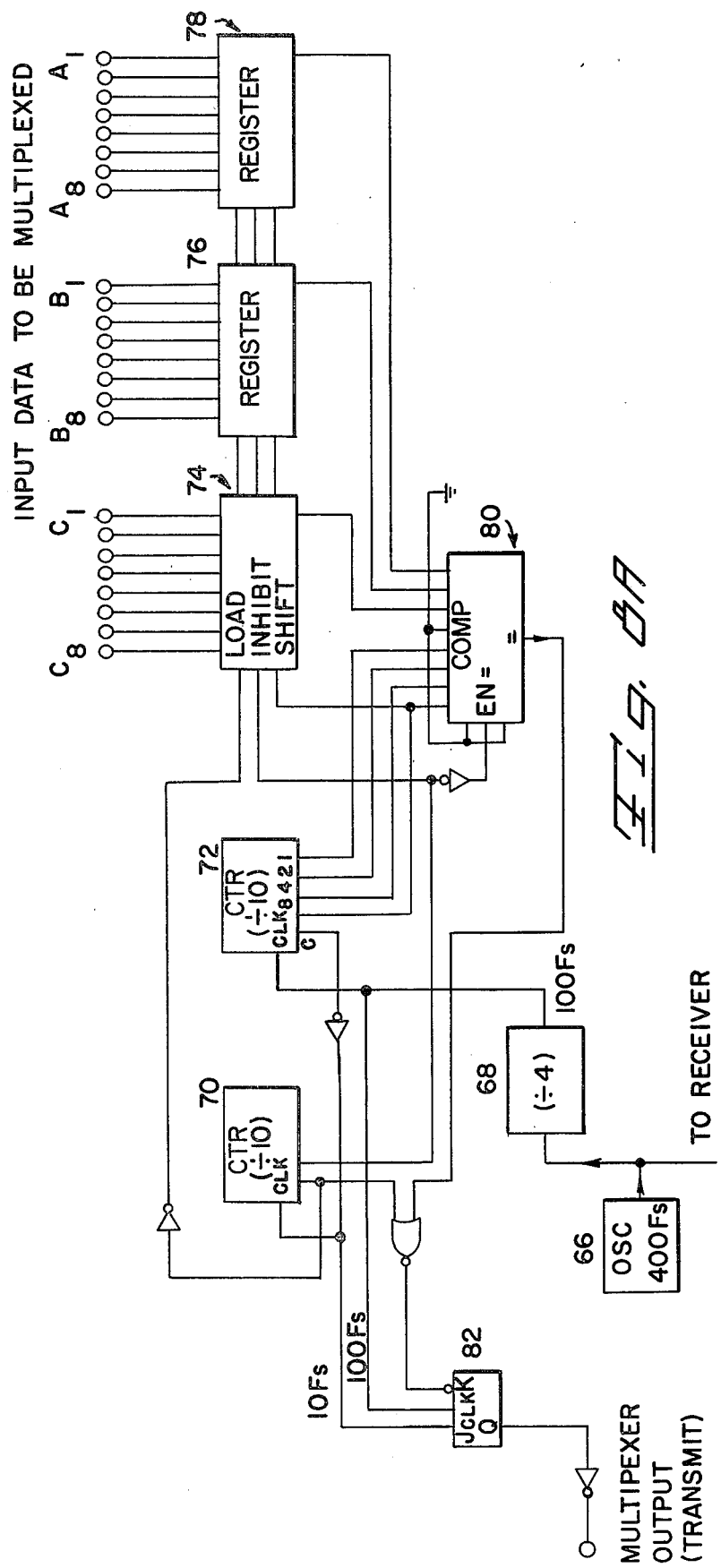

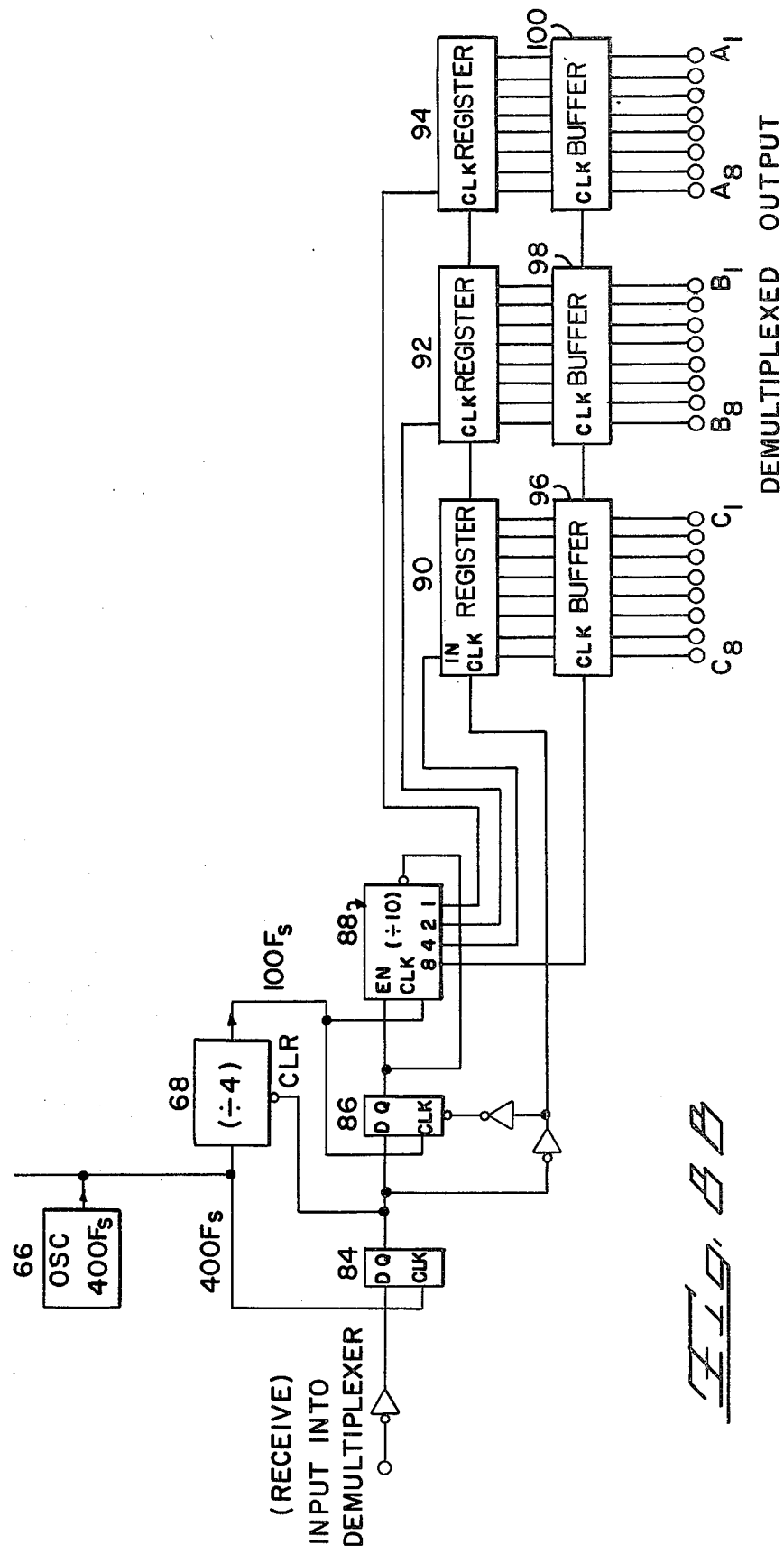

PULSE DURATION DIGITAL MULTIPLEXING SYSTEM

BACKGROUND OF THE INVENTION

1. Field of the Invention

The present invention relates to a method for multiplexing of digital data over a single communication channel. Specifically, the invention pertains to simultaneous transmission of multiple digital inputs over a single channel by means of a multiplexing technique herein referred to as Pulse-Duration-Multiplexing, or PDM.

2. The Prior Art

In telecommunication, and data transmission in general, transmission lines represent substantial capital investments. Many years ago, carrier telephony was first introduced to handle four telephone conversations simultaneously over a single pair of open wires. The principle used in this carrier telephony is known as Frequency Division Multiplexing, FDM. It is still widely used for multiplexing of hundreds and even thousands of voice telephone channels over a microwave or coax-cable system.

Another multiplexing method, called Time-Division Multiplexing, TDM, works on the principle that sampled data from different input signal lines are sent out as pulses in proper time sequence. In view of rapid advances in digital technology, there is a growing tendency favoring TDM in future developments.

However, while these multiplexing equipments can provide communication channels more economically than individual physical wire channels over long distances, they are not inexpensive. Furthermore, these FDM and TDM equipments are designed and manufactured mainly for use with telecommunication common carrier facilities. Thus, a private user looking for some kind of digital multiplexing equipment for specialized applications is often at a loss to find one that suits his purpose.

Both FDM and TDM equipment are designed for highly efficient utilization of the transmission band of the wires, cables, or other mediums. However, there are instances where the frequency band width far exceeds the actual requirement, and thus frequency efficiency is of less importance. For example, users of optical fiber do not often fully utilize the band width capability.

Accordingly, the telecommunications industry is in need of a multiplexing technique which can be implemented with relatively simple circuitry, which is flexible in design and application, and which is economical to use. Moreover, the multiplexing system must be transparent to data, that is, it should not pose any requirement on composition or format of the data signals except the speed limit on baud rate.

SUMMARY OF THE PRESENT INVENTION

An approach to multiplexing for digital data transmission is proposed as an alternative to regular FDM/TDM which is relatively simply implemented, for example, using TTL medium-scale-integration logic. The present multiplexing scheme envisions clocking-in multiple inputs at a sampling frequency. The result of each sampling gives "1" or "0's" for each input. By assigning weights of 1, 2, 4, etc., respectively to each input, a combined binary coded decimal (BCD) value is determined. According to the BCD value thus obtained, a pulse is generated of a duration determined by the BCD value. A train of pulses can be generated for applications having a comparatively large number of inputs, each pulse in the train representing the multiplexed data of a set of inputs. At the receiving end, the pulse is amplified and quantized to digital level; the length or duration of the pulse is then measured and decoded into its BCD components. The subject scheme can be described as a Pulse Duration Multiplexer, PDM.

Accordingly, it is an object of the present invention to provide a digital multiplexer which facilitates incorporation into relatively simple circuitry.

A further object is to provide a digital multiplexer which is reliable in operation.

Still further, an object of the present invention is to provide a digital multiplexer with inherent synchronization compensation.

A still further object of the present invention is to provide a digital multiplexer which is transparent to signals.

Another object of the present invention is to provide a digital multiplexer which is flexible in design and application.

A further object of the present invention is to provide a digital multiplexer which facilitates incorporation into a single-chip integrated circuit.

Yet a further object of the present invention is to provide a digital multiplexer which is economically and readily incorporated into digital logic.

These and other objects of the present invention which will become apparent to one skilled in the art, are achieved by a preferred embodiment which is described in detail below, and which is illustrated in the accompanying drawings.

BRIEF DESCRIPTION OF THE ACCOMPANYING DRAWINGS

FIG. 8A is the logic diagram for a 24-channel Pulse Duration Multiplexer transmitter.

FIG. 8B is the logic diagram for a 24-channel Pulse Duration Multiplexer receiver.

FIG. 9 is a representation of one possible packaging configuration for the 24-channel multiplexer of FIGS. 8A and 8B.

DETAILED DESCRIPTION OF THE PREFERRED EMBODIMENT

The basic scheme for a three-channel Pulse Duration Multiplexer, or PDM, is described in principle immediately below with a detailed description of hardware implementation therefollowing. For purposes of explanation, three digital signals A, B, and C are to be transmitted over a single transmission channel. These signals are mutually independent, may be of different baud rates, and are generally not in sunchronization with any common clock.

The input signals A, B, and C are sampled or "clocked-in", at a chosen rate Fs, into a parallel load shift register. If Fs is several times the highest input baud rate, then the clocked outputs will be substantially the same as the inputs.

A "bit frequency" ($f_t$) generator, from which the Sampling Frequency Fs is derived, runs at 10 Fs. A decade counter divides $f_t$ to give Fs; thus, $f_t = 10$Fs. Let Ts = Sampling Period = 1/Fs, and t = bit time = 1/$f_t$, then Ts = 10Δt.

The result of each sampling gives "1"'s or "0"'s for A, B, C. By assigning weights of 1, 2, and 4, respectively, to A, B, and C, the combined binary coded decimal (BCD) output of the three samples has a value ranging from "0" to "7". According to the BCD value thus obtained, a pulse P is generated. The duration of P is equal to "BCD plus one" times Δt (1×Δt to 8×Δt) in duration. This P is sent out as "1" to the transmitter. At the end of P, there is a period of (10−P) Δt of down or "0" time.

Figure 1:
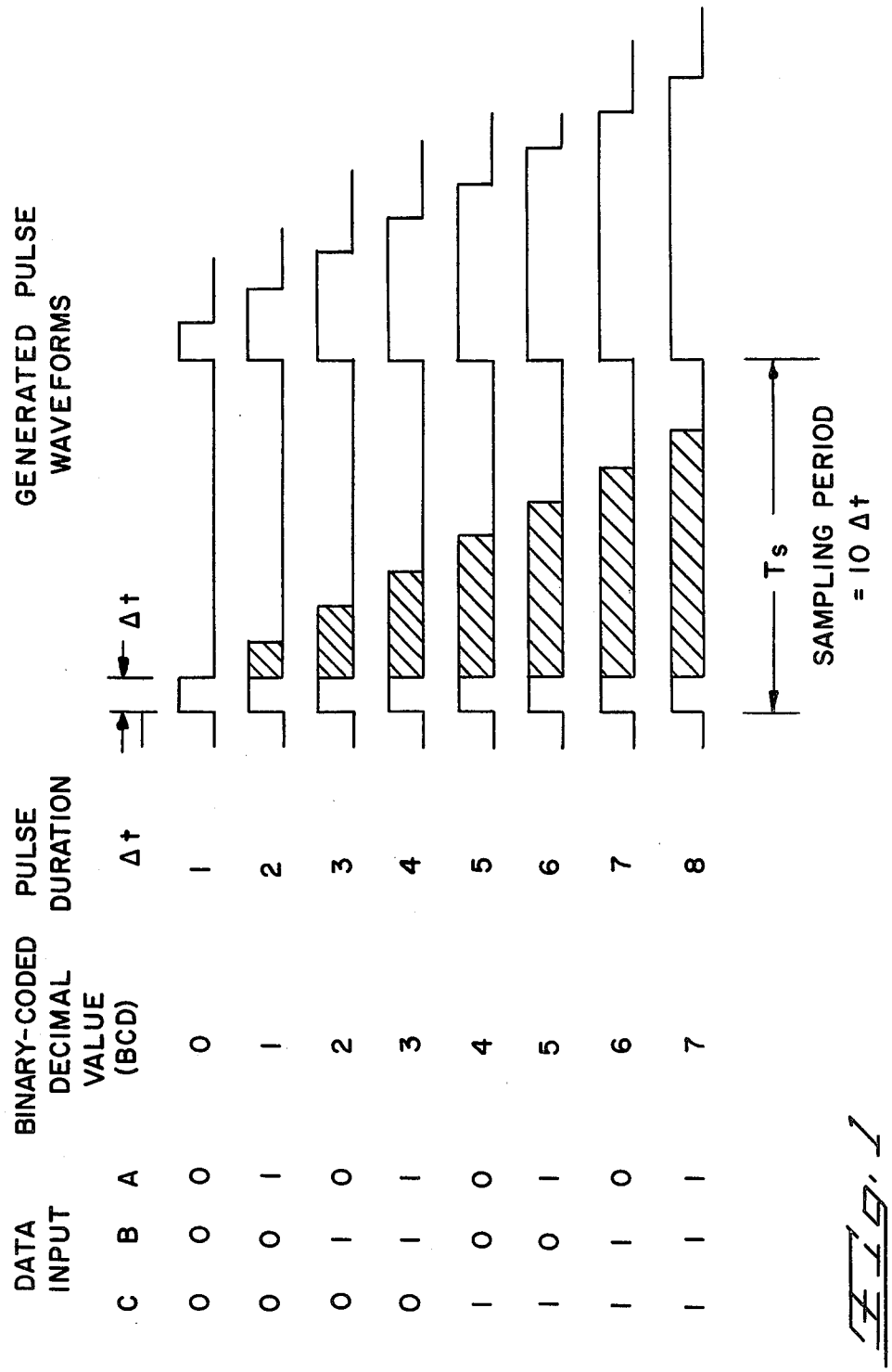
FIG. 1 is a timing diagram of the pulses generated according to three channels of input data for a 3 channel multiplexer.

The shape of the output pulse P for various combination of A, B, and C are shown in FIG. 1. At the receiving end, the "P" pulses are first amplified and quantized to digital level. The receiver/demultiplexer is provided with a clock of frequency fr. This receiving clock, being derived independently from the remote transmitter, may actually run at a frequency slightly different from $f_t$ (but the difference easily can be kept within, say ±0.1%). The arrival of P has random phase relation with the receiver clock. A phase-adjustment logic may be provided so that fr is started by the "clocked-in" rising edge of received pulse P. In this way, the sampling time at the receiver is always nearly in the middle of the input bit time.

By using the receiver clock fr to count the length of P, but skipping the first count, the result will be from "one" to "seven", corresponding to the BCD encoding value at the transmitting end. At the falling edge of P, the counter ouput is latched into an intermediate buffer. Then at the rising of the next P, the data is trasferred to the output buffer. The purpose of using double buffer is that the falling time of P varies with length of P, but rising of P is always at fixed time interval Ts. Hence, the above-described scheme is neither FDM, nor TDM. Since the multiplexed data is represented by the length or duration of P, it may accordingly be termed Pulse Duration Multiplex, or PDM in shorthand.

Figure 2:
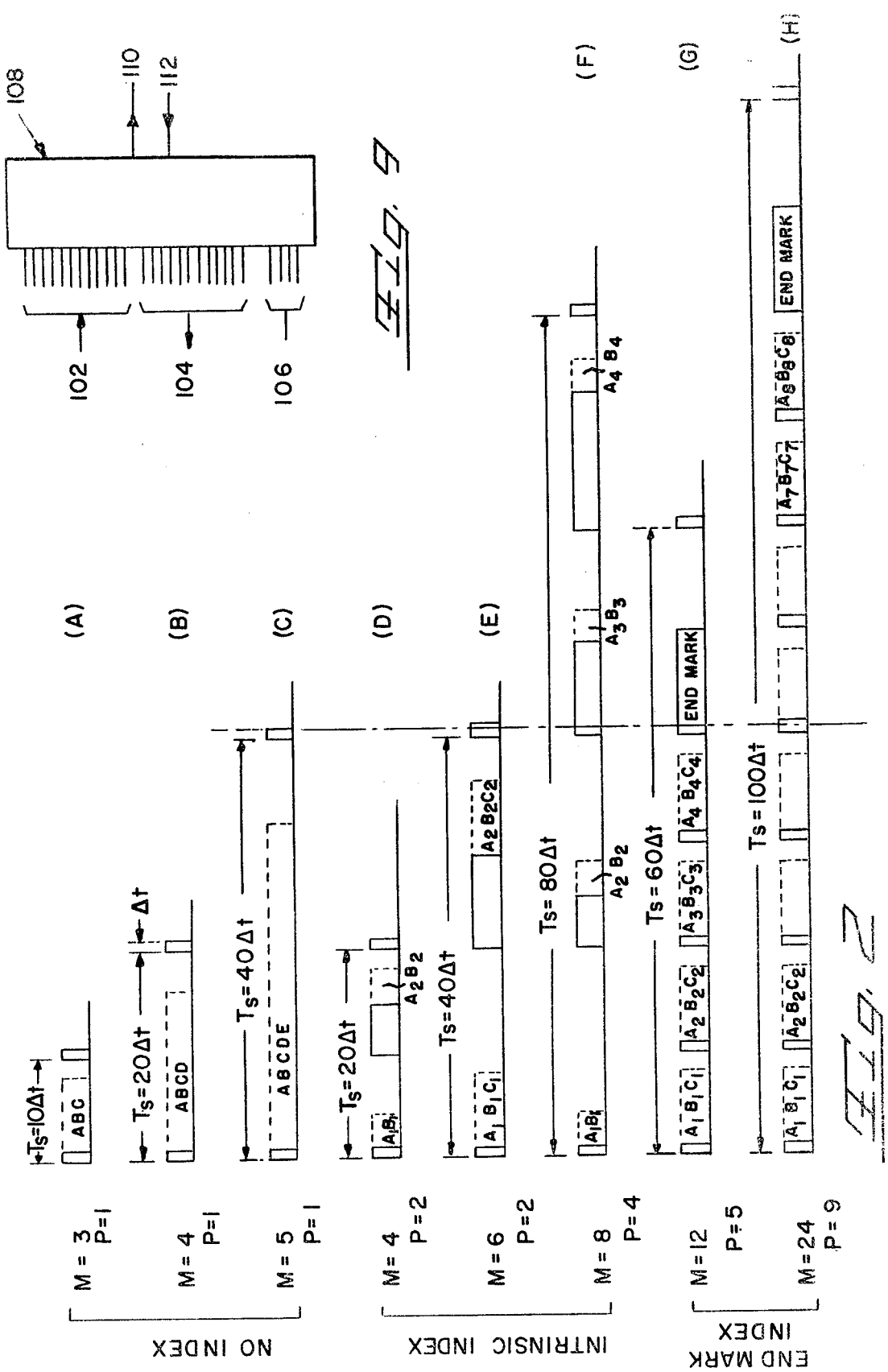
FIGS. 2A–2H are composite timing diagrams showing output waveforms of multiplexer embodiments for various numbers of input lines.

Expansion of the above-scheme for more input channels is described below. The above described PDM combines three input channels into one multiplexed channel. The multiplexing factor, M, is equal to 3 as shown by FIG. 2A. The transmitting frequency $f_t$ is equal to 10 Fs, because the output pulse P has a maximum length equal to 8 Δt.

If the same principle is used for m=4, then $f_t$ has to be equal to 20 Fs so as to generate P of durations from "1" to "16" times Δt, and t=½Ts, etc, (FIG. 2C). Similarly, it is possible to make M=5 by using $f_t$=40Fs, P="1" to "32" times Δt, and Δt=1/40Ts, etc (FIG. 2C). However, examination of the above shows that every increase of M by one requires the doubling of $f_t$. Thus, increasing from M=3 to M=5 requires a fourfold increase of $f_t$. An upper limit is rapidly approached.

An alternate scheme for quadraplex (M=4) is to use the basic principles of the present invention, but generating two pulses, P1 and P2, after each sampling. The first pulse P1, represents inputs A1, B1, and C=0, the second P2 represents A2, B2, and C=1. Thus the transmitted output consists of short (1 to 4) and long (5 to 8) pulses alternatively. This approach enables easy expansion of an M=3 system to an M=4.

By combining the single pulse M=4 (P=1 to 16×Δt) with the two pulse scheme, we can obtain an M=6 system with two pulses per sampling, $f_t$=40Fs (FIG. 2E). This intrinsic indexing method can be further extended for M=8 with four pulses in a group. (FIG. 2F).

By utilizing the conventional concept of indexing, yet retaining the basic scheme of PDM, it is feasible to transmit a series of pulses, say, P1, P2–Pn, each of "1" to "8" Δt in duration, for a multiplex factor of M=3 N. In order to keep track of the data sequence, an Indexing Pulse, or End Pulse, is generated after Pn. Then the next pulse is P1, followed by P2, etc. As all the data pulses P1, P2, etc, range in duration from 1×Δt to 8×Δt, the End Pulse should be of a value other than 1-8 Δt. A convenient value is 10 Δt. For N=4, the multiplexing factor M equals 12. For N=8, M equals 24. The output waveforms are shown in FIGS. 2G and 2H. Note that while N is chosen to be multiples of 4 because available logic devices usually come in 4-bit or 8-bit units, such a limitation is not inherent to the principles of the present invention.

The highest bit rate that the transmission channel can handle is limited by the physical system chosen. For analytical purposes, let this highest allowable bit rate be designated $f_t$ max. In the multiplexing scheme described above, for M=3, the bit rate $f_t$ is equal to 10 Fs. Since Fs is dependent on the highest baud rate x of any of the input channels, and has to be N times that rate, thus:

| M=3 | TS=10 t | $f_t$=10Fs=10Nx |
| M=4 | TS=20 t | $f_t$=20Fs=20Nx |
| M=6 | TS=40 t | $f_t$=40Fs=40Nx |
| M=12 | TS=60 t | $f_t$=60Fs=60Nx |
| M=24 | TS=100 t | $f_t$=100Fs=100Nx |

Note from the above that for M=12 or 24, the increase in $f_t$ is more gradual because of the higher efficiency in frequency band utilization through indexing pulse.

Taking M=24, and assuming N=8, then $f_t$=100·8·x=800X. Thus for X=1000, $f_t$=0.8 megabits/sec. For x=12,500, $f_t$=10 megabits/sec.

The actual hardware implementation of such multiplexers can be done readily with the TTL family of IC's as shown below. It is also feasible to use other logic family IC's such as MOS or CMOS, and even to have the required logic designed into a LSI single chip device. Following are descriptions of (a) a basic M=3 multiplexor, (b) modification of the above into a M=4, (c) expansion into M=24.

A. Basic 3-channel Pulse Duration Multiplexer

Figure 5A:
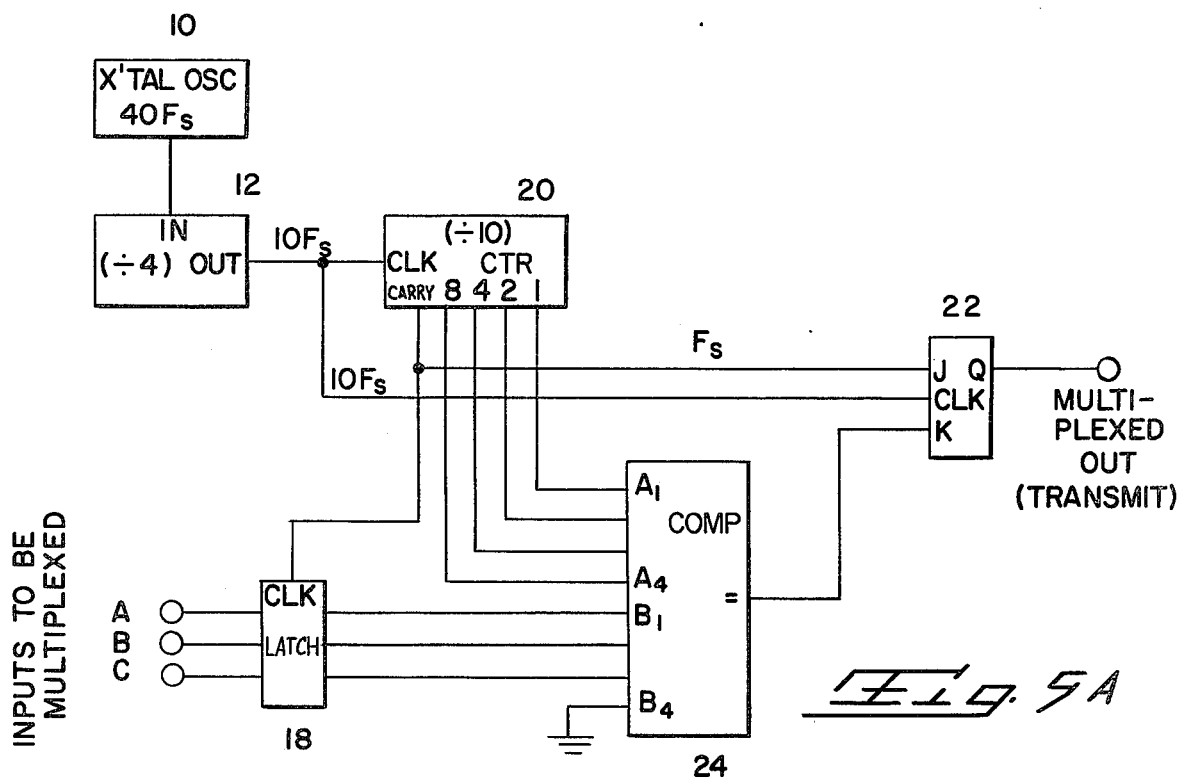
FIG. 5A is a logic schematic of a three-channel Pulse Duration Multiplexer.

The initial consideration is to determine the Sampling Frequency Fs which, in the general case of being asynchronous with the input channels, is selected to be at least 8 times the input baud rate. Referring to FIGS. 5A and 5C, a crystal oscillator 10 equal to 40 Fs is used, and its output feed two separate divide-by-four ($\div 4$) binary counters 12, 14. Counter 12 runs continuously giving a 10Fs output, and is used for the transmitter (multiplex). The other counter 14, used for the receiver (demultiplexer), has a "clear" or reset input 16, and is enabled to count only after receiving a new input pulse.

The transmitter portion serves to combine the three input signals A, B, and C. An input latch 18 is used to store A, B, and C and is clocked-in at the Sampling Frequency Fs. The 10 Fs output from the counter 12 is used to feed a decade counter 20. The "carry"-out is used for clocking-in the A, B, C inputs.

Figure 3:
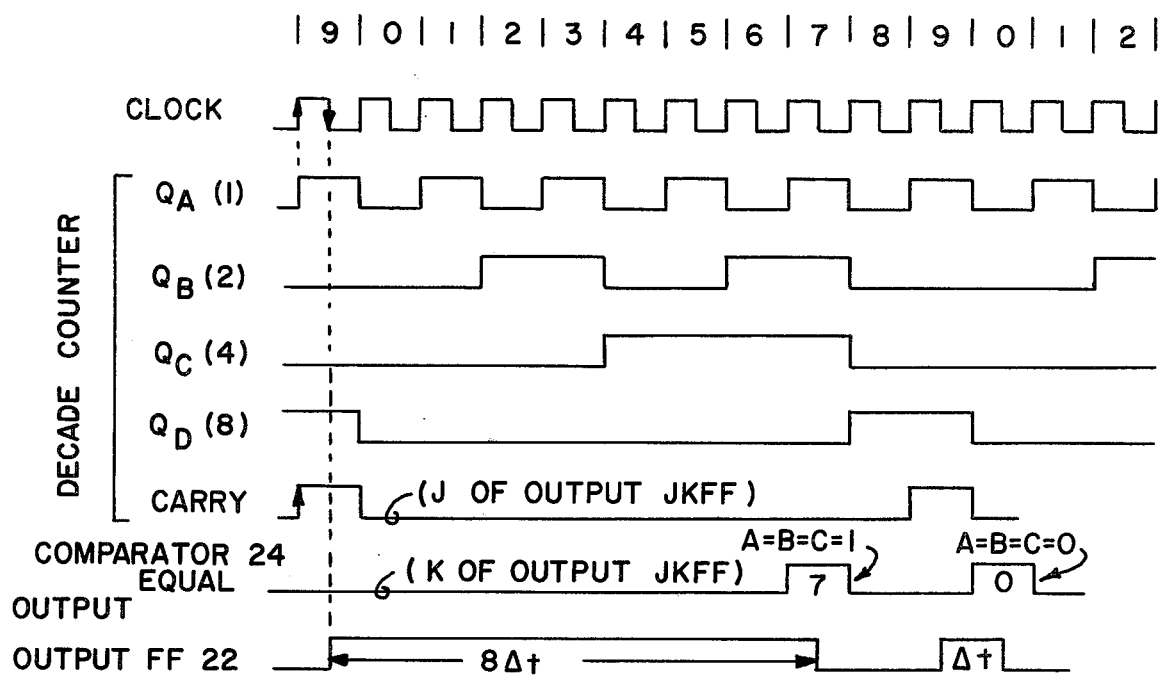

From the timing diagram in FIG. 3, it will be appreciated that the "carry" is high during a count of "9". This "carry" serves as the clock to latch in a new "sample" of ABC into the input latch register 18, and to steer the output flip-flop 22 to a J high. This J high turns the FF to a Q=1 upon the falling edge of the input clock.

A comparator 24 is provided. The latched data A, B, C, are compared with the 1, 2, 4 outputs of the decade counter 20. When an "equal" is reached, the output of the comparator 24 goes high, steers the JKFF 22 to K high, and turns the FF 22 to $\bar{Q}$ upon falling of clock. If A=B=C=1, the flip takes place during count =7, and the FF output is turned on for 8 $\Delta$t. If A=B=C=0, the FF flips low after one clock period ($\Delta$t). In this way, depending on the binary coded decimal value (BCD) of input signals A, B, and C, an output pulse of 1 to 8 times t is generated. This output pulse width is greater than A·B·C (BCD) valve by one. As the JKFF is always turned on by the steering of J high with the "carry", the rising edges of the output pulses are always at equal time intervals corresponding to Ts=1/Fs.

At the receiving end, (FIG. 5C), the received signal is first amplified and quantized to the TTL level. The receiving oscillator is, by design, of the same frequency and would normally not be different from the transmitting frequency by more than 0.01%. However, the received input pulse may be different from the receiver oscillator in phase. As the objective is to measure the width, or duration, of a received pulse, phase variation must be adjusted. As stated above, the system clock generator actually oscillates at 40Fs, or four times the bit frequency. Using the 4× clock to clock-in the received data, (FIG. 4A), the first FF 26 output represents the re-clocked received pulse, which must be a multiple of the 4× clock, and may differ from the input by ($\pm \frac{1}{4}\Delta$t), but this will not affect the result of pulse-duration count of the receiver. The turning-on of FF 26 immediately enables the ($\div 4$) counter 14, which starts to count up at the falling edge of the 4× clock. The output of the ($\div 4$) counter 14 gives the first rising edge of the 10Fs clock after $\frac{1}{2}\Delta$t.

Figure 4B:
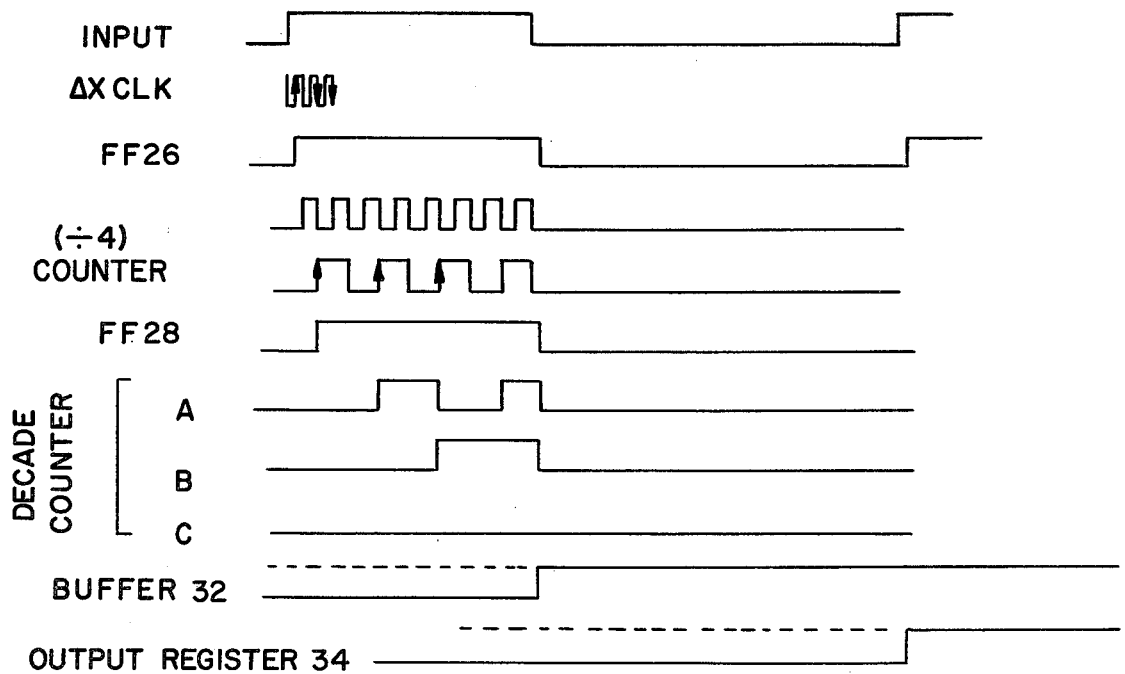
FIGS. 4A and 4B are timing diagrams for receiver outputs of FIG. 5C.
Figure 4A:
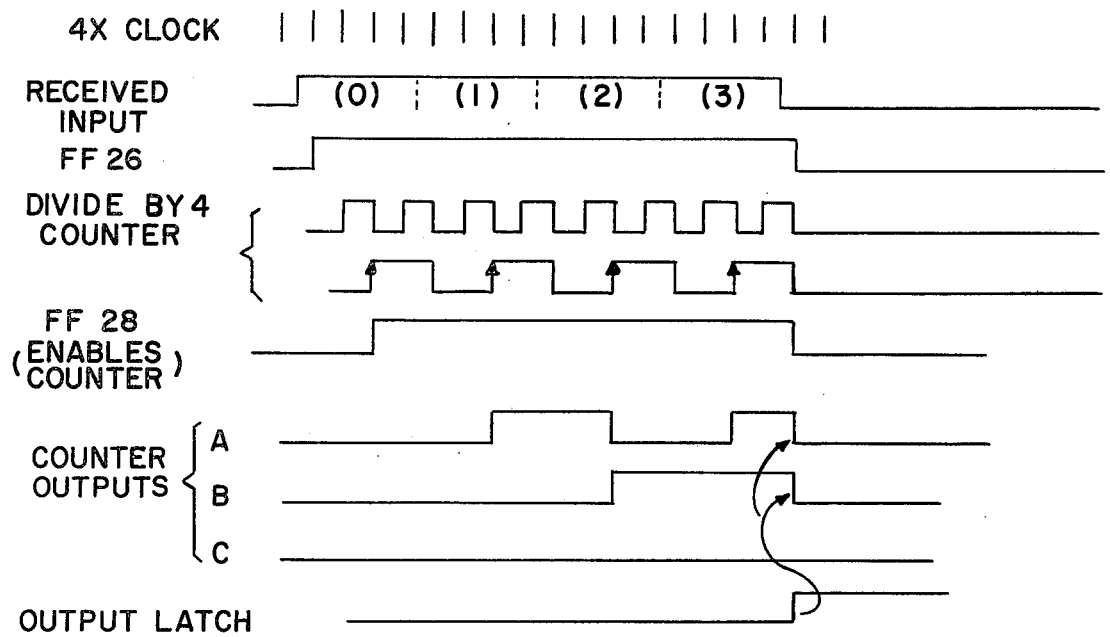

As the transmitted output pulses are of 1 t to 8 t in duration, with 1 t corresponding to A, B, C=0, a second FF 28 is used for skipping one count. Thereafterward, a decade counter 30, enabled by FF 28, counts the input pulse width (less one) until the input pulse falls to zero. The falling edge of the input pulse causes the counter output to be transferred to a latch 32, and then resets the counter. In order that the received outputs change at uniform rate, a second latch 34 is used. The latch 34 works on the rising edge of the input pulse, and this gives a nearly uniform output clocking rate (FIG. 4B). A logic diagram for this M=3 receiver system is shown in FIG. 5C.

Figure 5B:
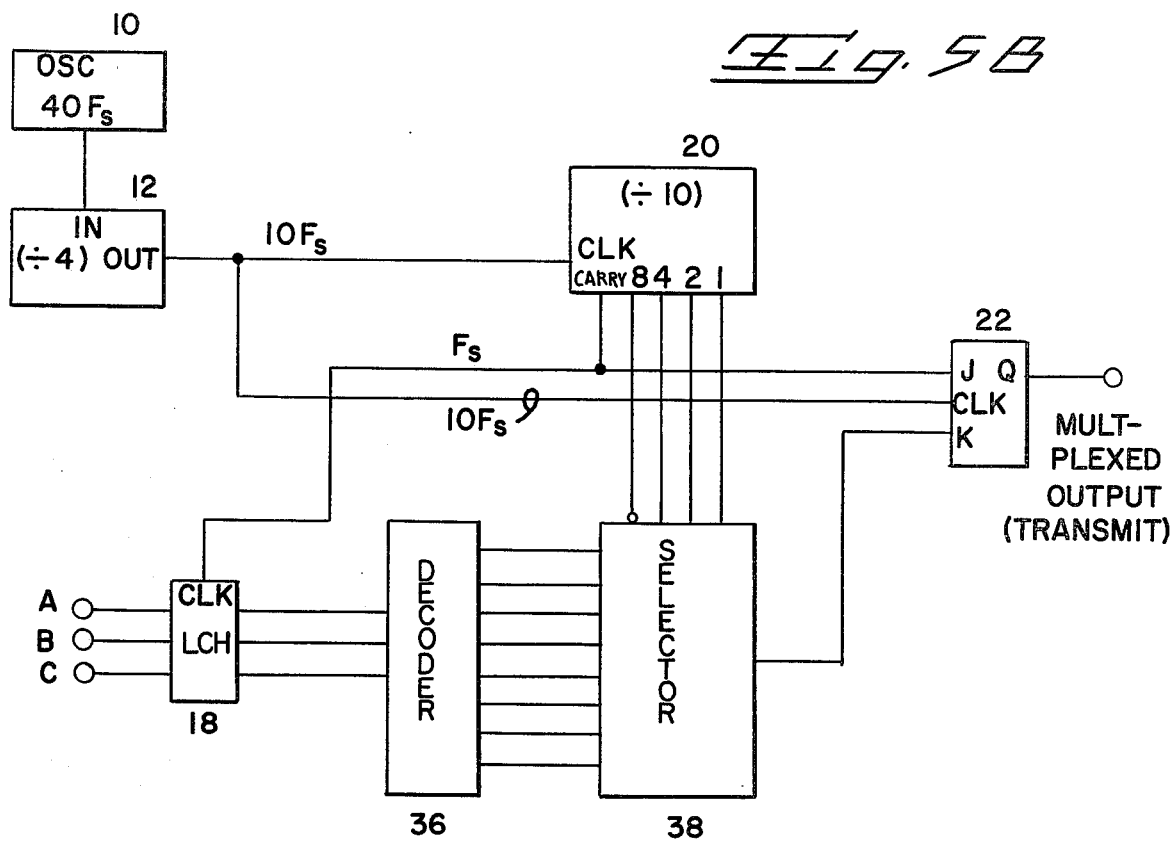
FIG. 5B is a Pulse Duration Multiplexing Triplexer logic diagram.
Figure 5C:
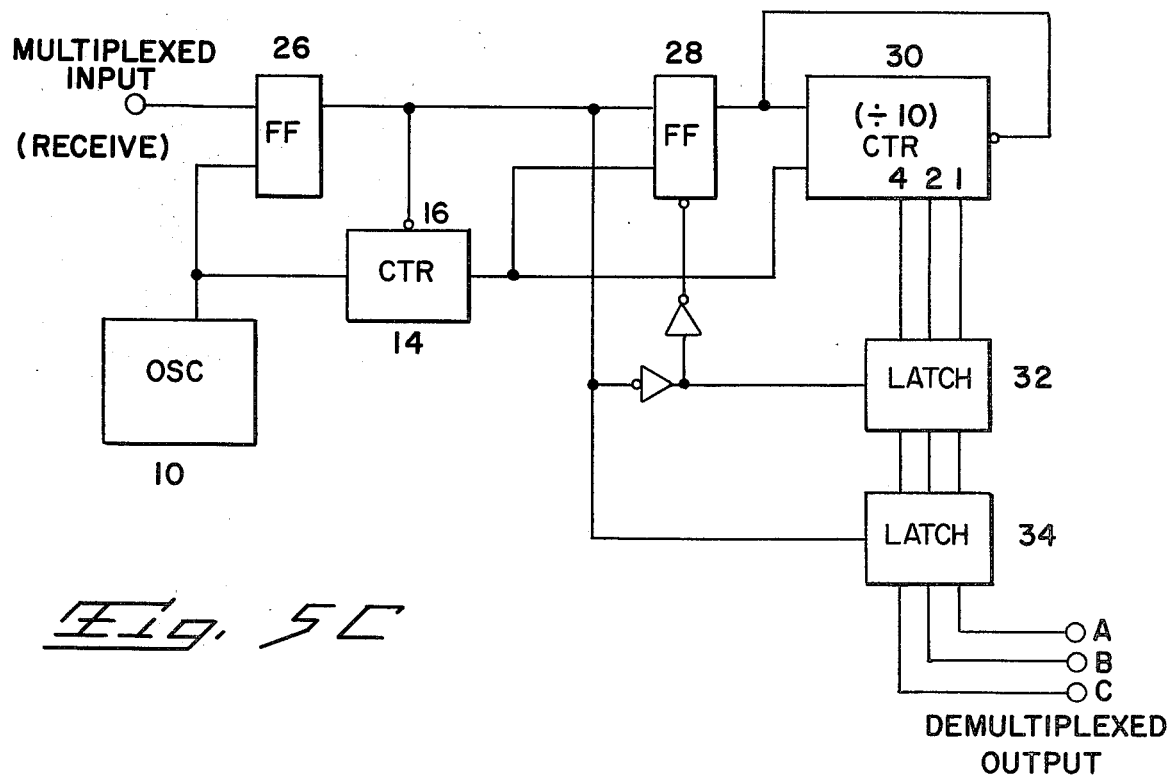
FIG. 5C is a Pulse Duration De-multiplexer for use in conjunction with either the transmitter configuration of FIG. 5A or 5B.

A similar alternative design for a M=3 transmitter, using slightly different I.C. chips, but functionally identical, is shown in FIG. 5B. Instead of the comparator 24 described above (FIG. 5A), a 3 to 8 decoder 36 together with a 8 to 1 selector 38 (FIG. 5B) may be used for the weighting of inputs ABC.

B. M=4 Quadruplexer

Figure 6A:
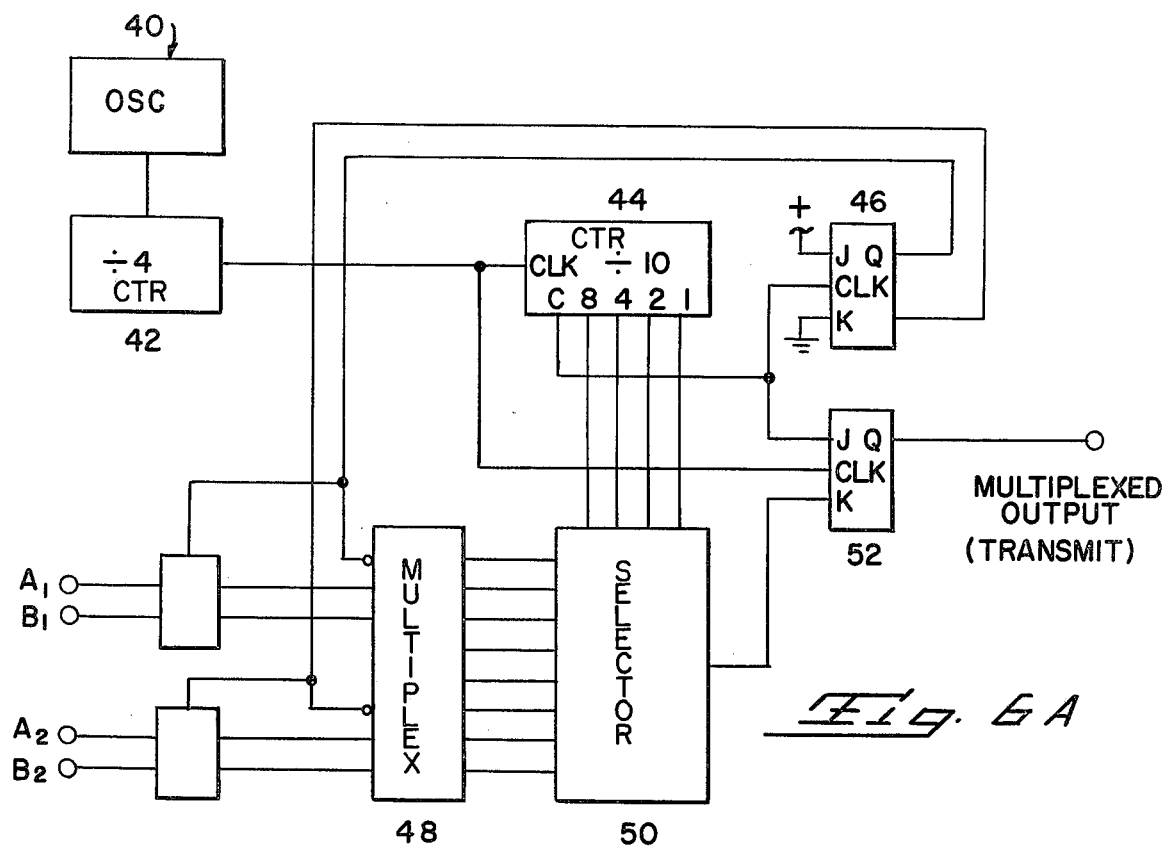
FIG. 6A is a logic diagram for a guadraplexer transmitter.
Figure 6B:
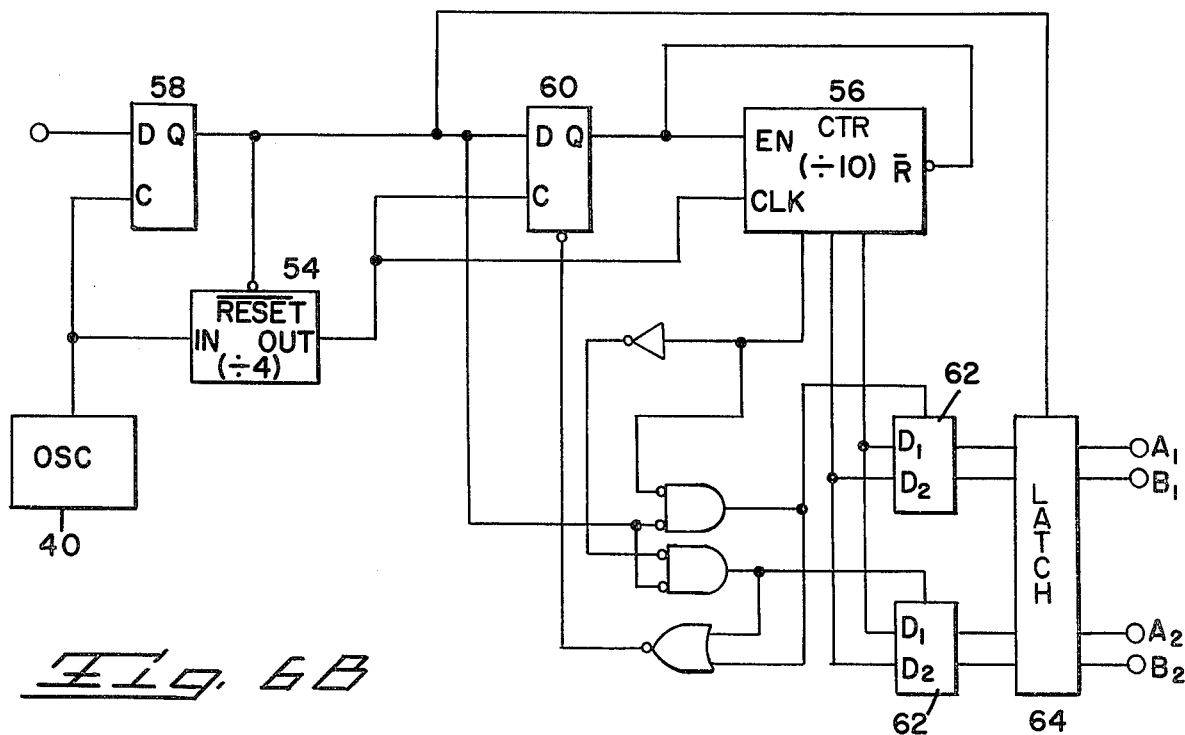
FIG. 6B is a logic diagram for a quadraplexer receiver.

The basic triplexer described above may be modified into a quadruplexer as described below with reference to FIGS. 6A and 6B. By changing the inputs into two groups, A1, B1, and A2, B2, and by assigning a value of C=0 for A1, B1, C=1 for A2, B2, we obtain two sets of ABC's, i.e. A1B1C1 and A2B2C2, where C1 and C2 are assigned 0 and 1 instead of actual input data. A frequency generator 40 operates at 8 MHZ and inputs to a $\div 4$ counter 42, which runs at 20Fs. After every tenth count by a =10 counter 44, a first FF 46 flips. The output of FF 46 determines whether C is to be a "1" or "0". The inputs ABCD are latched in at a Sampling Frequency, and input therefrom to a dual "2 to 4" multiplexer 48. A "1 of 8" selector 50 is utilized in the manner described above, and outputs into a second FF 52. In this way, the transmitted output pulse alternates in width of 1-4 and 5-8 times $\Delta$t. At the receiving end, a ($\div 4$) counter 54, ($\div 10$) counter 56, and FF's 58, 60 are provided in the manner previously set forth. The output of counter 56 is stored separately via FF's 62 and output latch 64, depending on whether the count is less than "4" or is equal to or greater than "4".

C. M=24 PDM System

Figure 7:
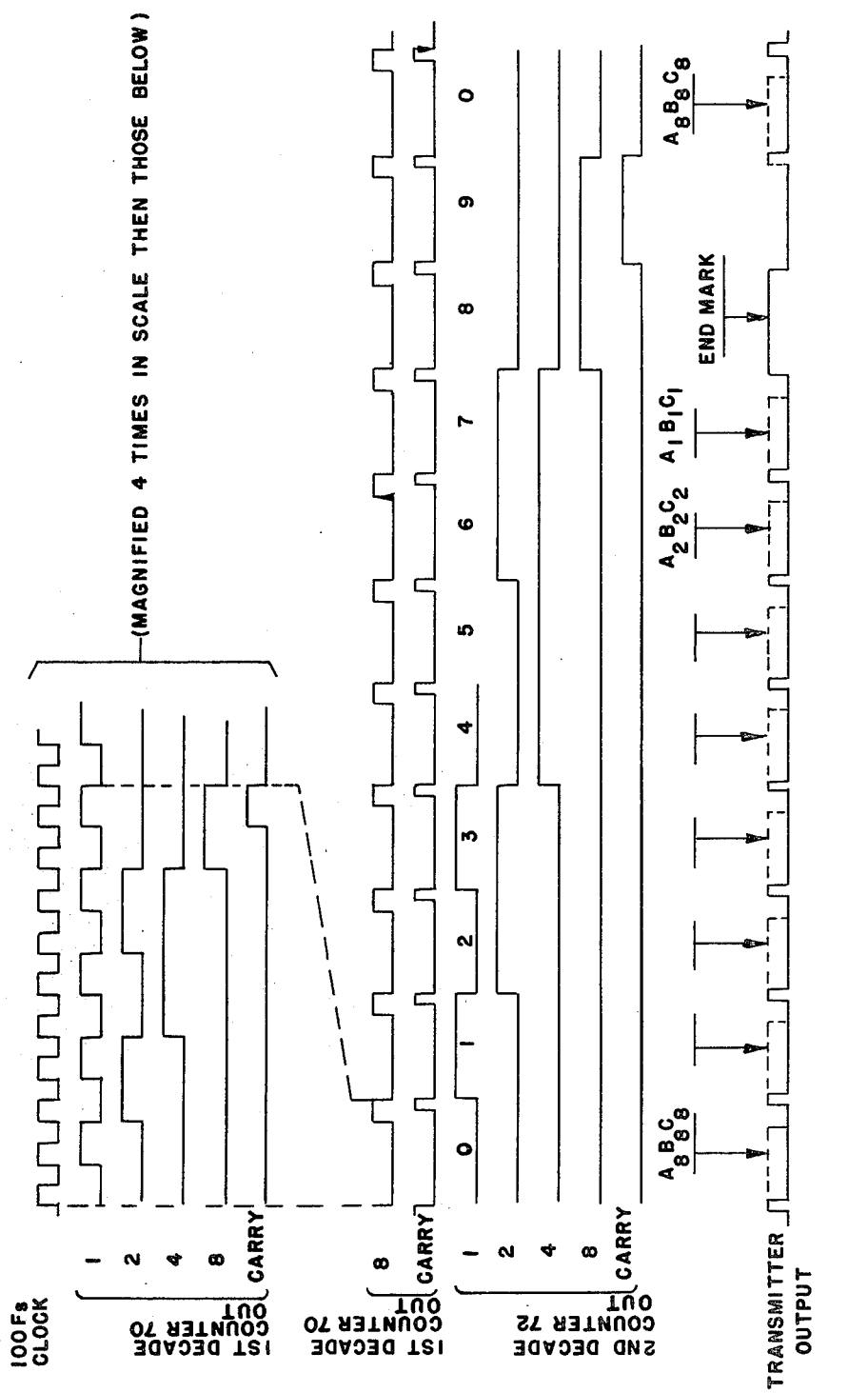
FIG. 7 is a timing diagram for a 24-channel multiplexer.

The logic for a M=24 system is shown by FIGS. 8A and 8B, and it will be readily appreciated that the basic M=3 scheme described above is retained. The output pulses are "1" to "8" times t. However, these pulses, instead of always representing the same three channels, represent instead different groups of AiBiCi (where i=1,2,3, . . . 8 for M=24) (FIG. 7). In order to keep track of the value of i, an "end mark" is generated by the transmitter. The regular data pulses are of (1-8) t in width. The end mark, to be distinquished from data, is by design equal to 10 t in duration.

In the transmitting section an oscillator 66, ($\div 4$) counter 68, and first decade counter 70 are provided. A second decade counter 72 is added so that during one sampling period Ts there are 100 bit time t. The 24 input channels are divided into three groups: A1A2 . . . A8, B1 . . . B8, and C1 . . . C8. They are clocked into three 8 bit parallel-in shift registers 74, 76, 78, at Fs rate. Referring to the timing diagram of FIG. 7, this parallel loading takes place when the count of the second decade reads "9" or "carry". Immediately after loading, an output corresponding to A8B8C8 is generated, and then at count 8 of the 1st decade counter 70, a shift takes place such that A8B8C8 are thrown away, and A7B7C7 take their places. This keeps on until A1B1C1 have been read and thrown out. By this time, the 2nd decade counter 72 reaches "8". This "8" high not only inhibits further "shift" of the registers 74, 76, 78, but also inhibits the comparator 80 from giving any "1" output.

This has the effect of keeping the FF 82 from turning off until the "carry" of the 2nd decade 72 is on. Thus the output FF 82 gives a pulse of 10 t, to be used as "end mark" for the receiver, and then stay down for another 10 t. During this time "loading" for new sampled data takes place, and then transmission of data output commences as the counter begins a new cascaded decade cycle.

In the receiver section, the basic principle of the M=3 system is retained as logically represented by FF 84, 86 and decade counter 88. The AiBiCi outputs are serially shifted into three "serial in, parallel out" registers 90, 92, 94. After the 8th serial shift, the registers 90, 92, 94 are full. Then the "end mark" generates a count of 8 in the receiver decade counter 88, causing the data in the registers to be transferred to the output buffers 96, 98, 100. From FIG. 8, it will be appreciated that the total number of IC chips used is small.

In view of the foregoing description, some general observations will be apparent. First, the PDM system for digital transmission lends itself to simple circuitry, and is inherently as reliable as the IC chips used. Further, the system is transparent to the signals being multiplexed, i.e., it does not read the input data during its operation so long as the baud rates are kept within the designed limit.

Secondly, the system does not have a synchonization problem, as the local transmitting clock and corresponding remote receiver clock may differ by 1-2% and still maintain reliable operation.

Thirdly, the system does not require any filters other than capacitors regularly used in TTL circuitry, thus it is free from stringent design requirements associated with filters.

Lastly, it is feasible to incorporate a PDM transmitter and receiver of M=24 into a single IC chip. The design is limited by "pin out" rather than by complexity of circuitry.

It is feasible to incorporate a PDM transceiver (multiplexer and demultiplexer) inside the housing of a multi-pin connector shown schematically in FIG. 11. M transmitting inputs 102, M receiving inputs 104, power lines 106, all proceed into a connector housing 108, with an output line 110 to the transmitting driver and an input line 112 from the receiver output provided. In view of the circuitry simplicity, a PDM system may be designed and manufactured at comparatively low cost.

While the above description of the preferred embodiment exemplifies the principles of the present invention, other embodiments which will be apparent to one skilled in the art and which utilize the teachings herein set forth are intended to be within the scope and spirit of the present invention.

What is claimed is:

1. A multiplexing transmitter for simultaneous transmission of digital input signals over a single communication channel, comprising:
   registration means for clocking-in said multiple input signals at a sampling frequency; and
   binary counting means having multiple outputs sequentially activated according to a specific binary count for assigning each of said clocked-in signals a respective binary coded weight, so that a unique binary coded decimal value is specified by a combination of said coded weights of said clocked-in input signals, and said means including means for generating a pulse of a duration determined by said unique combined binary coded decimal value of said clocked-in input signals, and means for corresponding each of said input signals to a respective one of said counting means outputs.

2. The multiplexing transmitter as set forth in claim 1, wherein said means for corresponding said input signals to said counting means outputs comprising a comparator.

3. The multiplexing transmitter as set forth in claim 1, wherein said counting means having a terminal output activated at the end of a counting sequence, with said activation of said terminal output occuring at said sampling frequency.

4. A multiplexing transmitter for simultaneous transmission of a set of digital input signals over a single communication channel, comprising:
   bit frequency generation means generating at a preset bit frequency;
   binary counting means for sequentially counting said frequency bits and having a plurality of outputs sequentially activated according to a specific binary count, said counting means having a terminal output activated at the end of a counting sequence, with said activation of said terminal output occurring at a sampling frequency;
   registration means for clocking-in said set of input signals at said sampling frequency;
   means for assigning each of said clocked-in signals a respective binary coded weight so that a unique binary coded decimal value is specified by a combination of said coded weights of said clocked-in input signals; and
   means for generating a pulse of a duration determined by said unique combined binary coded decimal value of said clocked-in input signals.

5. The multiplexing transmitter as set forth in claim 4, wherein said means for assigning binary coded weights comprising means for corresponding each of said input signals to a respective one of said counting means outputs.

6. The multiplexing transmitter as set forth in claim 5, wherein said means for corresponding said input signals to said counting means outputs comprising a comparator.

7. A de-multiplexing receiver for decoding an encoded pulse having a duration representing a combined binary coded decimal value of a set of digital input signals, comprising:
   means for registering said encoded pulse;
   binary counting means for deriving binary coded weight components having multiple outputs activated according to a specific binary count wherein each binary coded weight component corresponds to one of said binary counting means output count; and
   output pulse generating means for generating digital output signals, each corresponding to one of said derived binary coded weight components.

8. A multiplexing system for simultaneous transmission of a set of digital input signals over a single communication channel, comprising:
   a. a transmitter comprising:
      registration means for clocking-in said multiple input signals at a sampling frequency;
      binary counting means for assigning each of said clocked-in signals a respective binary coded weight so that a unique binary coded decimal value is specified by a combination of said coded weights of said clocked-in input signals, said means having multiple outputs sequentially activated according to a specific binary count, and means for corresponding each of said input signals to a respective one of said counting means outputs, and said binary counting means including means for generating an encoded pulse of a duration determined by said combination of said coded weights of said clocked-in input signals; and b. a receiver comprising:
   means for registering said encoded pulse;
   means for decoding binary coded weight components comprising said combination of said coded weights of said clocked-in input signals from said duration of said encoded pulse; and
   output pulse generating means for generating digital output signals, each corresponding to one of said binary coded weight components.

9. A multiplexing system as set forth in claim 8, wherein said means for corresponding said input signals to said counting means outputs comprising a comparator.

10. A multiplexing system as set forth in claim 8, wherein said receiver means for deriving said binary coded weight components comprising binary counting means having multiple outputs activated according to a specific binary count, each of said binary coded weight components corresponding to one of said binary counting means outputs count.

* * * * *